US009297826B2

(12) United States Patent
Fang et al.

(10) Patent No.: US 9,297,826 B2
(45) Date of Patent: Mar. 29, 2016

(54) SYSTEM AND METHOD FOR MONITORING AN ACCELEROMETER

(71) Applicant: Freescale Semiconductor, Inc., Austin, TX (US)

(72) Inventors: Deyou Fang, Chandler, AZ (US); Keith L. Kraver, Gilbert, AZ (US); Heinz Loreck, Tempe, AZ (US); Mike A. Margules, Austin, TX (US); Mark E. Schlarmann, Chandler, AZ (US)

(73) Assignee: FREESCALE SEMICONDUCTOR INC., Austin, TX (US)

( * ) Notice: Subject to any disclaimer, the term of this patent is extended or adjusted under 35 U.S.C. 154(b) by 428 days.

(21) Appl. No.: 13/791,343

(22) Filed: Mar. 8, 2013

(65) Prior Publication Data

US 2014/0250971 A1 Sep. 11, 2014

(51) Int. Cl.
*G01P 21/00* (2006.01)
*G01P 15/125* (2006.01)

(52) U.S. Cl.
CPC ............... *G01P 21/00* (2013.01); *G01P 15/125* (2013.01)

(58) Field of Classification Search
CPC ........................................................ G01P 21/00
USPC .......... 73/1.01, 1.37, 514.01, 514.16–514.18, 73/514.24, 514.32
See application file for complete search history.

(56) References Cited

U.S. PATENT DOCUMENTS

| | | | | |
|---|---|---|---|---|
| 6,023,960 | A * | 2/2000 | Abrams | G01P 21/00 73/1.01 |
| 6,101,864 | A | 8/2000 | Abrams et al. | |
| 7,980,135 | B2 * | 7/2011 | Prandi | G01C 19/5726 73/504.12 |
| 8,156,805 | B2 * | 4/2012 | Hayner | G01C 19/56 329/360 |
| 2008/0028823 | A1 * | 2/2008 | Samuels | G01P 21/00 73/1.37 |
| 2010/0122565 | A1 * | 5/2010 | Miller | G01P 21/00 73/1.37 |
| 2010/0145660 | A1 * | 6/2010 | Lang | G01D 3/08 702/193 |
| 2010/0263445 | A1 * | 10/2010 | Hayner | G01C 19/56 73/504.12 |
| 2011/0146402 | A1 * | 6/2011 | Donadel | G01C 19/56 73/504.12 |
| 2011/0192226 | A1 * | 8/2011 | Hayner | G01C 19/5776 73/504.12 |
| 2012/0036931 | A1 * | 2/2012 | Paulson | G01P 15/125 73/514.32 |
| 2013/0042664 | A1 * | 2/2013 | Wrede | G01P 15/097 73/1.38 |

OTHER PUBLICATIONS

Costlow, Lynn E.,“A MEMS Gyro for the Harsh Engine Compartment Environment”, Apr. 1, 2007, printed from http://www.sensorsmag.com/automotive/a-mems-gyro-harsh-engine-compartment-environment-1353 (5 pages).

* cited by examiner

*Primary Examiner* — Hezron E Williams
*Assistant Examiner* — Hoang Nguyen
(74) *Attorney, Agent, or Firm* — Ingrassia Fisher & Lorenz, P.C.

(57) ABSTRACT

Systems and methods are provided for monitoring operation of MEMS accelerometers (100). In these embodiments a control loop (112) having a forward path (114) is coupled a MEMS transducer (110), and a test signal generator (124) and test signal detector (126) is provided. The test signal generator (124) is configured to generate a test signal and apply the test signal to the forward path (114) of the control loop (112) during operation of the MEMS accelerometer transducer (110). The test signal detector (126) is configured to receive an output signal from the control loop and detect the effects of the test signal in the output signal. Finally, the test signal detector (126) is further configured to generate a monitor output indicative of the operation of the sensing device to provide for the continuous monitoring of the operation of the MEMS accelerometer (100).

18 Claims, 5 Drawing Sheets

MONITOR OUTPUT
514
ACCUMULATOR
512
COMPARATOR
510
FILTER
508
506
DELAY
OUTPUT SIGNAL
DELAY CONTROL
DEMODULATION SIGNAL
500

SYSTEM AND METHOD FOR MONITORING AN ACCELEROMETER

TECHNICAL FIELD OF THE INVENTION

The present invention relates generally to microelectromechanical systems (MEMS) devices. More specifically, the present invention relates to monitoring MEMS accelerometer operation.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems.

One example of a MEMS sensor is a MEMS accelerometer. MEMS accelerometers are sensitive to acceleration or acceleration forces. These forces may be static, like the constant force of gravity, or they can be dynamic, caused by moving or vibrating the sensor. Accelerometers may sense acceleration forces along one, two, or three axes or directions. From this information, the movement or orientation of the device in which the accelerometer is installed can be ascertained.

Commonly, MEMS accelerometers react to acceleration with a change in electrical capacitance, which causes the output of an energized circuit, connected to the sensor, to vary. One common form of MEMS accelerometer uses a movable element or plate that moves under acceleration above a substrate. The movement of the movable element changes capacitance, and the electrical circuit connected to the MEMS accelerometer structure can measure the change in capacitance to determine the acceleration forces. Such MEMS accelerometers are widely used in a variety of sensing applications. For example, vehicle or automotive applications may use MEMS accelerometers, to determine when to deploy the vehicle airbag or activate a stability and/or traction control system. In addition, consumer electronics devices, such as video game controllers, personal media players, cell phones, and digital cameras, also use MEMS accelerometers in various applications to detect the orientation and/or respond to movement of the device.

BRIEF DESCRIPTION OF THE DRAWINGS

A more complete understanding of the present invention may be derived by referring to the detailed description and claims when considered in connection with the Figures. It should be noted that these figures are not necessarily drawn to scale, and that in these figures like reference numbers refer to similar items throughout the Figures, and:

DETAILED DESCRIPTION

Figure 1:
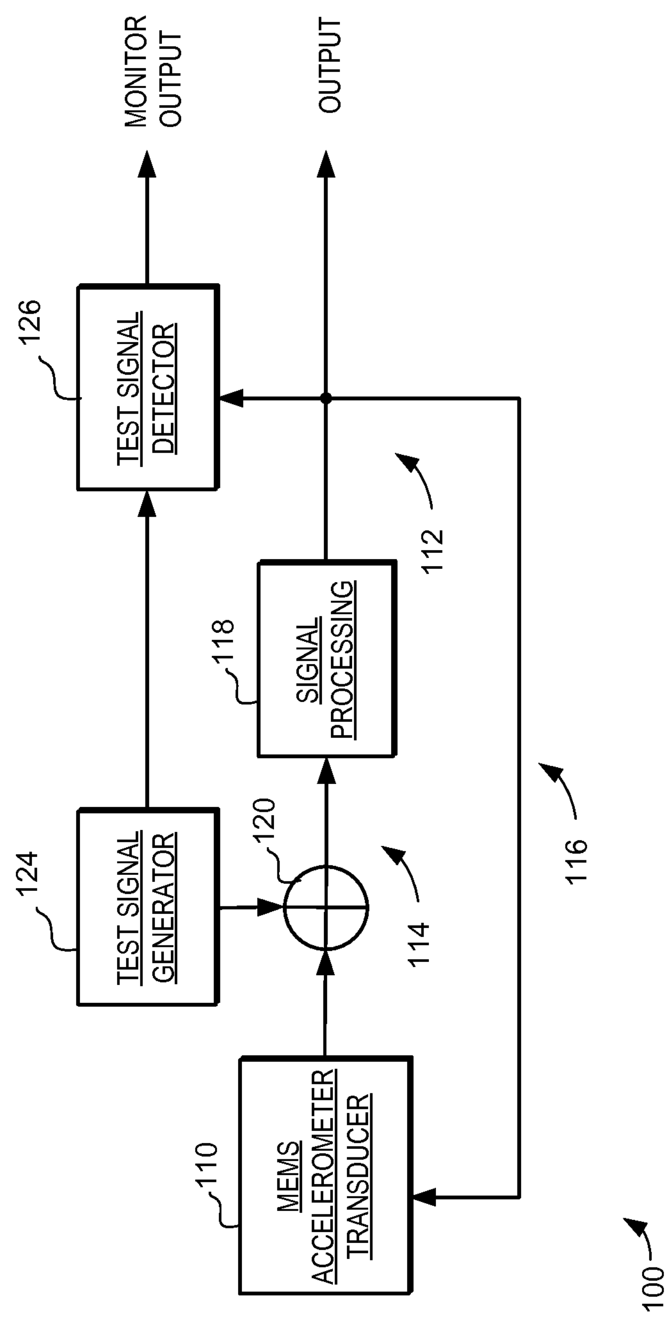
FIG. 1 is a schematic view of a sensing portion of a MEMS accelerometer with monitoring in accordance with an embodiment of the invention.

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

The following description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter.

For the sake of brevity, conventional techniques related to microelectromechanical systems (MEMS) fabrication and development, MEMS sensing, analog circuit design, and other functional aspects of the systems (and the individual operating components of the systems) may not be described in detail herein. Furthermore, the connecting lines shown in the various figures contained herein are intended to represent functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by software code representation thereof. In addition, certain terminology may also be used in the following description for the purpose of reference only, and thus are not intended to be limiting, and the terms "first," "second" and other such numerical terms referring to structures do not imply a sequence or order unless clearly indicated by the context.

The various embodiments described herein provide systems and methods for monitoring operation of a sensing device, and in particular, for monitoring operation of MEMS accelerometers. In these embodiments a control loop is coupled to a MEMS accelerometer transducer, and a test signal generator and test signal detector is provided. The test signal generator is configured to generate a test signal and apply the test signal to the forward path of the control loop during operation of the MEMS accelerometer transducer. The test signal detector is configured to receive an output signal from the control loop and demodulate the output signal to detect the effects of the test signal. Finally, the test signal detector is further configured to generate a monitor output indicative of the operation of the sensing device based at least in part on the detected effects of the test signal. Thus, the system is able to provide for the continuous monitoring of the operation of the MEMS accelerometer.

Specifically, the monitor output signal can be used to continuously verify that the MEMS accelerometer is functioning properly and providing good data. This self-monitoring can cover virtually the entire system, and in particular the signal processing, the control loop, and output circuits in the MEMS accelerometer. This monitoring can provide a continuous check on the operation of the MEMS accelerometer, and thus can be used to self-monitor virtually the entire system.

Such a system for monitoring the operation of the MEMS accelerometer can add to overall system reliability for those devices and systems that use MEMS accelerometers. For example, in vehicle stability control applications where MEMS accelerometers are used to determine when active stability control needs to be activated. In such systems the self-monitoring provided by the various embodiments provides the ability to better insure proper function of the vehicle stability control and thus can better handle the harsh and hostile environments commonly found in motor vehicles.

In general, MEMS accelerometers sense a change in electrical capacitance, with respect to acceleration. One common form of MEMS accelerometer uses a sensing transducer with a movable element that moves under acceleration above a reference substrate. The movement of the movable element changes capacitance, and the MEMS accelerometer structure can measure the change in capacitance to determine the acceleration forces.

When the reference substrate experiences a force that generates a change in acceleration force this change creates a change in capacitance measured by the sense measurement electrodes that sense oscillation of sense mass. In this way, the sensing transducer of the MEMS accelerometer can provide a measure of acceleration forces.

Many typical MEMS accelerometers use a control loop with a feedback path to control the motion of the sensing transducer. In general, the control loop provides a negative feedback that maintains the position of the movable element of the transducer near a reference value. Additionally, variations in the components of the transducer that are in the forward path of the loop (e.g. 232 and 234 in FIG. 2, which includes the spring constant) are attenuated by the loop-gain of the loop.

In accordance with one embodiment, a sensing device is provided that includes a MEMS accelerometer transducer, a control loop, a test signal generator, and a test signal detector. The control loop is coupled an output of the MEMS accelerometer transducer sensor and has a forward path generating an output of the sensing device and feedback path feeding back to an input of the sensing device to the MEMS accelerometer transducer (although in some embodiments the input and output of the sensing device uses the port or electrode). The test signal generator is configured to generate a test signal and a demodulation signal, where the test signal and the demodulation signal are frequency equivalent. The test signal generator is configured to apply the test signal to the forward path of the control loop during operation of the sensing device, and provide the demodulation signal to the test signal detector. The test signal detector configured to receive the output of the sensing device from the feedback loop and demodulate the output of the sensing device using the demodulation signal to detect the effects of the test signal. Finally, the test signal detector is configured to generate a monitor output indicative of the operation of the sensing device based at least in part on the detected effects of the test signal.

Turning now to FIG. 1, a simplified schematic view of an accelerometer 100 that includes a MEMS accelerometer transducer 110 with self-monitoring is illustrated. The MEMS accelerometer transducer 110 is coupled to a control loop 112. The control loop includes a forward path 114 that generates an output of the accelerometer 100 and a feedback path 116 feeding back the output to the MEMS accelerometer transducer 110. In this simplified example, the control loop includes a signal processing block 118 and a summer 120. Again, it should be noted that FIG. 1 is a conceptual illustration, and thus does not illustrate all the elements of a typical implementation. For example, a typical implementation would include additional signal processing elements in the control loop 112.

In accordance with the embodiments described herein, the sensing device also includes a test signal generator 124 and test signal detector 126. The test signal generator 124 is configured to generate a test signal and apply the test signal to the forward path 114 of the control loop 112. The test signal detector 126 is coupled to the output of accelerometer 100. Also, in the illustrated embodiment, the test signal detector 126 is configured to receive a demodulation signal from the test signal generator 124. The test signal detector 126 demodulates the output to detect the effects of the test signal in the output. Finally, the test signal detector 126 is configured to generate a monitor output indicative of the operation of the sensing device based at least in part on the detected effects of the test signal.

The monitor output provides indication of the operation of the system, and thus provides self-monitoring that verifies that the accelerometer 100 is functioning properly and providing good data. Furthermore, because the test signal is injected into the forward path 114 of the control loop 112, which is then fed back into the MEMS accelerometer transducer 110, this self-monitoring provides an indication of health that can cover virtually the entire system. This includes monitoring the MEMS accelerometer transducer 110 and the interface between the transducer and the electronic readout circuits, which are the mostly likely components to fail or have operational parameters shift. Furthermore, injecting the test signal into the forward path can simplify design as it does not require the use of complex multi-bit converters that may be required for injecting into the feedback path.

Additionally, because the test signal is generated to not interfere with the normal operation of the accelerometer 100 the system is able to provide for the continuous monitoring of the operation of the accelerometer 100 without preventing the normal operation of the MEMS accelerometer 100.

In general, the test signal generator 124 is configured to generate a test signal that can be injected into the rate feedback control loop without interfering with the normal operation of the MEMS accelerometer transducer 110. Furthermore, it is desirable to use a test signal that is relatively immune to being mimicked by naturally occurring sources of interference. For this reason the test signal generator can be configured to generate a modulated test signal. In one specific example, the test signal generator 124 generates a square wave using a modulation technique for use as the test signal.

In one further variation the test signal generator 124 is additionally configured to set the amplitude of the test signal. As will be described in greater detail below, the test signal detector 126 can be configured to determine a measure of the amplitude of the of the test signal demodulated from the quadrature feedback signal.

Figure 2:
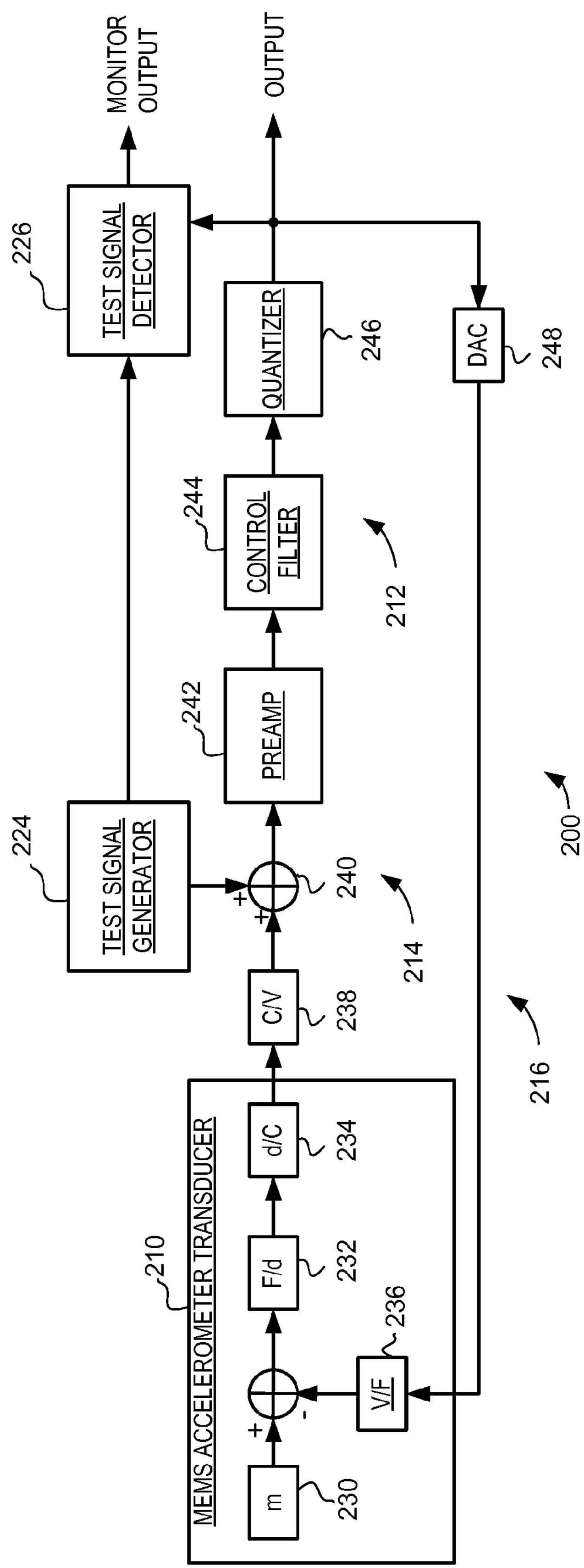
FIG. 2 is a schematic view of a sensing portion of a MEMS accelerometer with monitoring in accordance with an embodiment of the invention.

Turning now to FIG. 2, a schematic view of sensing device 200 that includes a MEMS accelerometer transducer 210 with self-monitoring is illustrated. The MEMS accelerometer transducer 210 is coupled to a control loop 212. In general, the control loop 212 provides a sigma-delta type force feedback to control operation of the transducer 212. The control loop 212 includes a forward path 214 that generates an output of the sensing device 200 and a feedback path 216 feeding back the output of the sensing device 200 to the MEMS accelerometer transducer 210. In this example, the MEMS accelerometer transducer 210 conceptually includes a drive mass 230, a force-to-displacement (F/d) converter 232, a displacement-to-capacitance (d/C) converter 234, and a voltage-to-force (V/F) converter 236. In this example, the forward path 214 of the control loop 212 includes a capacitance-to-voltage (C/V) converter 238, a summer 240, a preamp 242, a control filter 244, a quantizer 246, and a digital-to-analog converter (DAC) 248. During operation of the sensing device 200, a reference substrate is subjected to acceleration force and the mass 230 will be displaced, relative to the reference substrate, by an amount proportional to the acceleration force. This displacement causes a change in capacitance generated by d/C converter 234, which is converted by C/V converter 238 to an electrical signal.

This electrical signal is amplified by preamp 242 and filtered by control filter 244. The resulting signal is passed to quantizer 246 to generate the output of the sensing device 200. This output signal is thus a quantized signal that is proportional to acceleration force as measured using the mass 230 in the MEMS accelerometer transducer 210.

In addition to providing a measure of acceleration force, the output signal is passed to DAC 248. The DAC 248, which can comprise a single bit or multi bit converter, converts the quantized output to a voltage and feeds back the voltage into the MEMS accelerometer transducer 210 at V/F converter 236 where it is used to provide negative feedback by application of a biasing force to counteract the acceleration force applied to the reference substrate.

In accordance with the embodiments described herein, the sensing device 200 also includes a test signal generator 224 and a test signal detector 226. The test signal generator 224 is configured to generate a test signal and apply the test signal to the control loop 212. In particular, the test signal is summed into the forward path 214 of the loop at a convenient point using summer 240. As will be described in greater detail below, the test signal is preferably configured to not interfere with the output signal or the feeding back of the output signal to the MEMS accelerometer transducer 210.

The effects of the test signal being applied to the output signal carrier is passed through preamp 242, control filter 244, and quantizer 246 to the test signal detector 226. The test signal detector 226 demodulates the output signal to detect the effects of the test signal in the output signal. Finally, the test signal detector 226 is configured to generate a monitor output indicative of the operation of the sensing device based at least in part on the detected effects of the test signal.

The monitor output provides indication of the operation of the system, and thus provides continuous self-monitoring that verifies that the MEMS sensing device 200 is functioning properly and providing good data. Furthermore, because the test signal is injected into forward path of the control loop this self-monitoring system can detect changes in the operational parameters related to F/d converter 232, d/C converter 234, C/V converter 238, V/F converter 236, and DAC 248.

Figure 3:
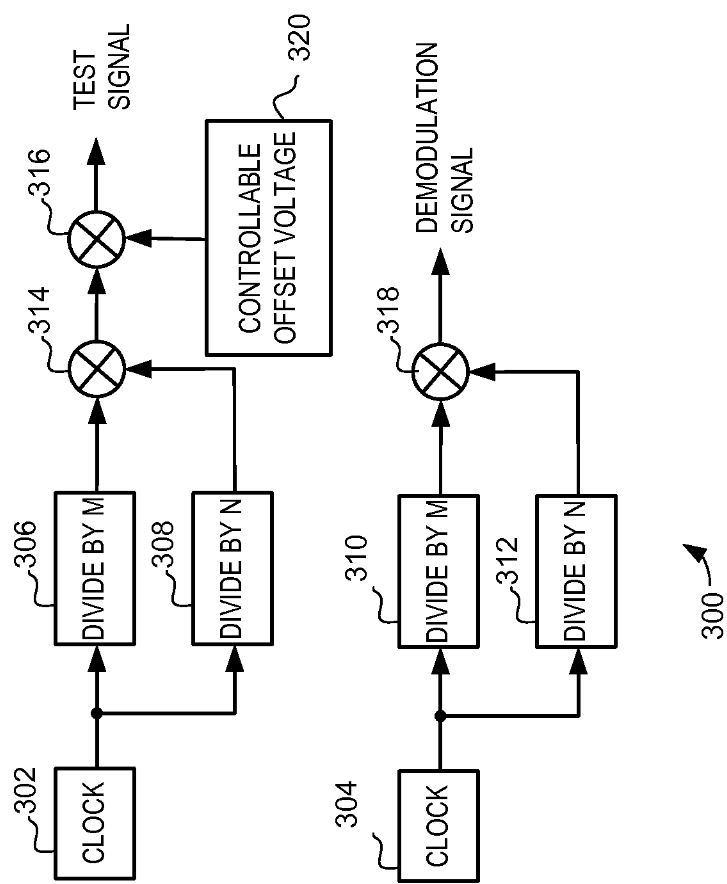
FIG. 3 is a schematic view of a test signal generator in accordance with an embodiment of the invention.

Turning now to FIG. 3, an exemplary test signal generator 300 is illustrated. In general, the test signal generator 300 is configured to generate a test signal that can be injected into the forward path of the control loop without interfering with the normal operation of a MEMS accelerometer. Additionally, the test signal is generated to contain frequency content not found naturally in the environment. Furthermore, in this embodiment the test signal generator 300 is also configured to generate a demodulation signal that can be used to extract the test signal from the output signal of the sensing device. In this embodiment the generated demodulation signal has the same frequency and phase content as that of the test signal yet independently generated. Because the demodulation signal is equivalent to the test signal the demodulation signal can be used to demodulate the output signal of the sensing device and separate the test signal from the acceleration signal.

In general, the test signal generator 300 generates a type of modulated signal. More specifically, the test signal generator 300 generates a test signal using double side-band suppressed carrier modulation. In the embodiment of FIG. 3, the test signal generator 300 includes a first clock 302, a second clock 304, dividers 306, 308, 310, and 312, mixers 314, 316 and 318, and controllable offset voltage 320. In general, the clock 302 provides an input to dividers 306 and 308 which divide the clock frequency by M and N respectively, where M and N are different prime numbers, and the resulting divided clock signals are XORed together by mixer 314. Likewise, the clock 304 provides an input to dividers 310 and 312 which divide the clock frequency by M and N, and the resulting divided clock signals are XORed together by mixer 318. In each case the result is a modulated square wave with frequency and phase content that is not likely to be mimicked by naturally occurring sources of interference. And because the same procedure is used to generate both the test signal and the demodulation signal, the demodulation signal can be used to demodulate the test signal from the output signal.

The controllable offset voltage 320 and mixer 316 are provided to facilitate control of the amplitude of the test signal. As will be described in greater detail below, the test signal detector can be configured to measure the amplitude of the of the test signal demodulated from the output of the sensing system.

As noted above, the test signal generator 300 is also configured to generate a demodulation signal that can be used to demodulate the test signal from the output of the sensing device. In the illustrated embodiment the demodulation signal is generated independently of the test signal, but has the same frequency and phase content. This reduces the probability of an undetectable failure in the test system. Specifically, because the test signal and the demodulation signal are generated independently it is less likely that they will both fail at the same time. This reduces the probability that the failure of the test signal generator to generate the test signal will be interpreted as evidence of that system is operating correctly.

Finally, it should be noted that the test signal generator 300 is just one example of the type of test signal generator that can be used. As another example, a square wave clock and controllable DC signal can be used to set the amplitude of the square wave having a constant fundamental frequency. Such a relatively simple square wave can be used as a test signal where interference is less likely to be an issue, and thus the need for a modulated square wave like that produced using the two dividers of FIG. 3 is not required.

Figure 4:
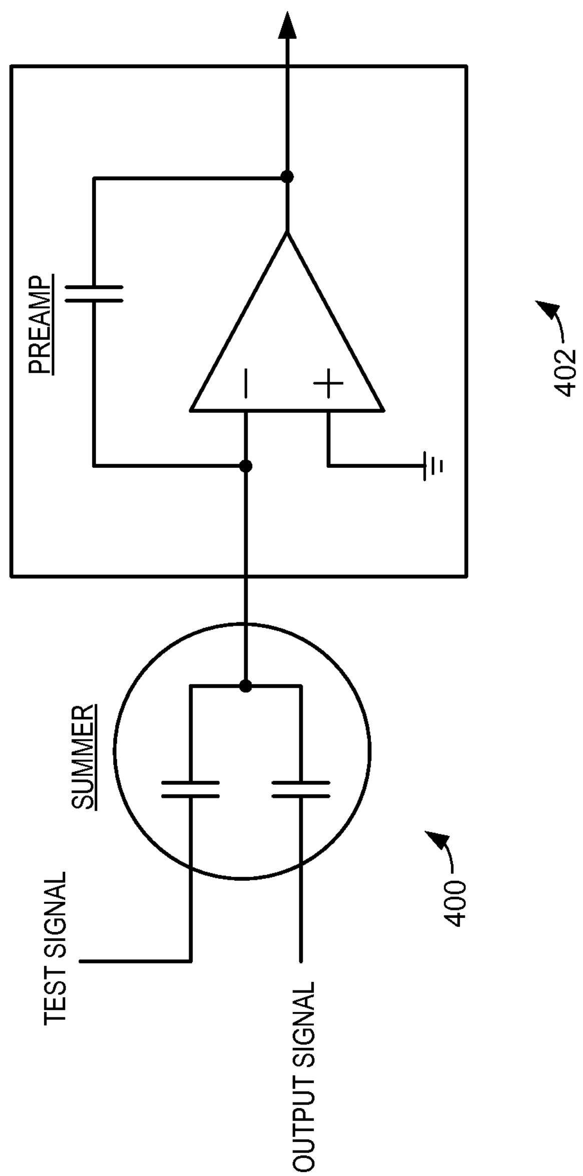
FIG. 4 is a schematic view of a summer and amplifier in accordance with an embodiment of the invention.

Turning now to FIG. 4, an exemplary summer 400 and amplifier 402 is illustrated schematically. The summer 400 and amplifier 402 are examples of the type of summer and amplifier that can be used in a sensing device. For example, summer 400 and amplifier 402 can be used to implement summer 240 and preamp 242 in sensing device 200. In this illustrated embodiment, the summer 400 uses a pair of capacitances to sum the test signal with the C/V output, within the amplifier 402 using a capacitive negative feedback configuration. This allows the test signal to be injected into the amplifier 402 virtual ground through an input capacitor. Additionally, this allows the gain of the summer 400 to be configured by selecting appropriate capacitance values. This configuration of the gain of the summer 400 can be used for amplitude control, either in addition to the controllable offset voltage 320 of FIG. 3 or in place of the controllable offset voltage 320.

Figure 5:
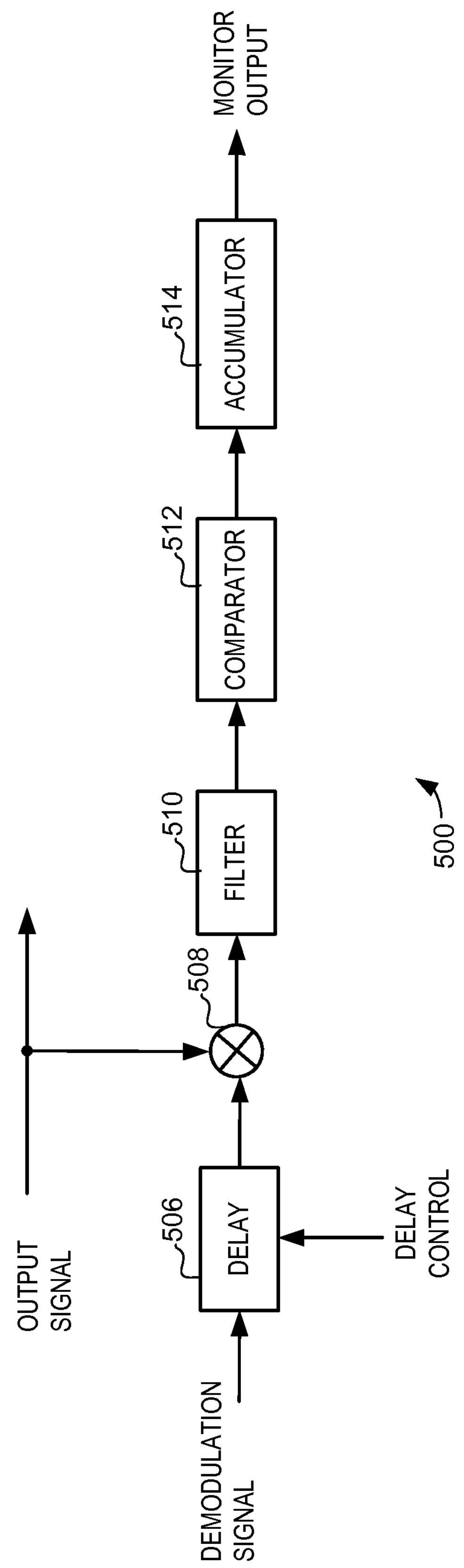
FIG. 5 is a schematic view of a test signal detector in accordance with an embodiment of the invention.

Turning now to FIG. 5, an exemplary test signal detector 500 is illustrated. In general, the test signal detector 500 is configured to demodulate the output to detect the effects of the test signal in the output signal. Furthermore, the test signal detector 500 is configured to generate a monitor output indicative of the operation of the sensing device based at least in part on the detected effects of the test signal. In this case, it does so by continuously assessing whether the demodulated output is greater than a specified threshold and then filtering this comparison result with an accumulator. The test signal detector 500 includes a controllable delay 506, a mixer 508, a filter 510, a comparator 512 and an accumulator 514. The controllable delay 506 receives the demodulation signal from the test signal generator and delays the signal by a controllable amount to equal the delay that occurred in the path taken by the test signal. This controllable delay thus allows the demodulation signal to be used by mixer 508 to demodulate the output signal and extract any test signal that may be present. And it should be noted that the signal detector 500 demodulates the test signal in the digital domain, which allows the detection of the test signal to be done digitally as well. This can improve the accuracy and reliability of the detection of the test signal.

A test signal present prior to the mixer 508 is translated in frequency to DC by said mixer and the demodulation process and is passed to the filter 510 that filters the test signal to remove any signals outside the test signal frequency. In one embodiment the filter 510 is a low-pass filter (LPF) that removes any large naturally occurring components that have been translated in frequency by mixer 508 (for example, offset in the sensing device and the acceleration signal). With any test signal that was in the output extracted, the comparator 512 compares the remaining signal to a first threshold to determine if test signal is present. An output indicating the result of the comparison is provided to the accumulator 514. The accumulator accumulates the comparison outputs, and provides a monitor output indicating the operation of the MEMS accelerometer.

As one example, the comparator 512 and accumulator 514 can be configured to only provide an indication of accelerometer failure when the comparator has failed to sense the test signal for a predetermined number of cycles. For example, the comparator 512 can be implemented to generate an output pulse when the effects of the test signal are not properly detected. Then, the accumulator 514 can be implemented to count these pulses and only provide an indication of failure when the accumulated number of pulses reaches a second threshold value. This prevents the monitor output from generating an indication of sensor failure for only intermittent indications that the test signal was not present, and thus prevents the monitoring from incorrectly identifying the accelerometer as failed.

Of course, the test signal detector 500 is just one example of the type of device that can be used to detect the test signal in the output of the sensing device, and other detecting devices could also be used. For example, in addition to detecting the effect of the test signal in the output signal, the test signal detector can be configured to determine the amplitude of the of the test signal demodulated from the output of the sensing device. From this, the performance of the drive amplitude of the MEMS accelerometer can be determined. In this embodiment the comparator could contain multiple thresholds (multi-bit comparator) if more accuracy is required. In such an implementation the determination of a measure of the amplitude provided by the comparator is indication of how the system is operating.

The various embodiments described herein thus provide systems and methods for monitoring operation of a sensing device, and in particular, for monitoring operation of MEMS accelerometers. In these embodiments control loop having a forward path is coupled with a MEMS transducer, and a test signal generator and test signal detector is provided. The test signal generator is configured to generate a test signal and apply the test signal to the forward path of the control loop during operation of the MEMS transducer. The test signal detector is configured to receive an output signal from the control loop and demodulate the output signal to detect the effects of the test signal. Finally, the test signal detector is further configured to generate a monitor output indicative of the operation of the sensing device based at least in part on the detected effects of the test signal. Thus, the system is able to provide for the continuous monitoring of the operation of the MEMS accelerometer.

In one embodiment, a system for monitoring operation of a sensing device is provided, where the sensing device includes microelectromechanical (MEMS) accelerometer transducer and a control loop having a forward path coupled to the MEMS accelerometer transducer, the system comprising: a test signal generator, the test signal generator configured to generate a test signal and apply the test signal to the forward path of the control loop during operation of the MEMS accelerometer transducer; and a test signal detector, the test signal detector configured to receive an output signal from the control loop and detect the effects of the test signal in the output signal, the test signal detector further configured to generate a monitor output indicative of the operation of the sensing device based at least in part on the detected effects of the test signal in the output signal.

In another embodiment a sensing device is provided, comprising: a microelectromechanical (MEMS) accelerometer transducer; a control loop coupled to the MEMS accelerometer transducer, the control loop having a forward path generating an output of the sensing device and a feedback path feeding back the output of the sensing device to the MEMS accelerometer transducer; a test signal generator, the test signal generator configured to generate a test signal and a demodulation signal, where the test signal and the demodulation signal have identical frequency content, and wherein the test signal generator is configured to apply the test signal to the forward path of the control loop during operation of the sensing device; and a test signal detector, the test signal detector configured to receive the output of the sensing device from the control loop and demodulate the output of the sensing device using the demodulation signal to detect the effects of the test signal, the test signal detector further configured to generate a monitor output indicative of the operation of the sensing device based at least in part on the detected effects of the test signal.

In one embodiment, a method of monitoring operation of a sensing device is provided, where the sensing device includes microelectromechanical (MEMS) accelerometer transducer and a control loop having a forward path coupled to the MEMS accelerometer transducer, the method comprising: generating a test signal; applying the test signal to the forward path of the control loop during operation of the MEMS accelerometer transducer; receiving an output signal from the control loop; detecting the effects of the test signal in the output signal; and generating a monitor output indicative of the operation of the sensing device based at least in part on the detected effects of the test signal.

Although the preferred embodiments of the invention have been illustrated and described in detail, it will be readily apparent to those skilled in the art that various modifications may be made therein without departing from the spirit of the invention or from the scope of the appended claims. Accordingly, it should be appreciated that the exemplary embodiments are only examples, and are not intended to limit the scope, applicability, or configuration of the invention.

What is claimed is:

1. A system for monitoring operation of a sensing device, where the sensing device includes microelectromechanical (MEMS) accelerometer transducer and a control loop having a forward path coupled to the MEMS accelerometer transducer, the system comprising:

a test signal generator, the test signal generator configured to generate a test signal and apply the test signal to the forward path of the control loop during operation of the MEMS accelerometer transducer; and a test signal detector, the test signal detector configured to receive an output signal from the control loop and detect effects of the test signal in the output signal, the test signal detector further configured to generate a monitor output indicative of the operation of the sensing device based at least in part on the detected effects of the test signal in the output signal, and wherein the test signal detector is configured to detect effects of the test signal in the output signal by demodulating the output signal using a demodulation signal received from the test signal generator.

2. The system of claim 1 wherein the test signal generator is coupled to the test signal detector to provide the demodulation signal to the test signal detector, where the demodulation signal has a frequency content equal to the test signal.

3. The system of claim 1 wherein the test signal generator uses modulation techniques to generate the test signal.

4. The system of claim 1 wherein the test signal generator includes a first clock having an output, a first divider having an output and a second divider having an output, the output of the first clock coupled to the first divider and the second divider, and wherein the test signal generator generates the test signal by XORing the output of the first divider with the output of the second divider.

5. The system of claim 4 wherein the first divider divides by a first prime number, and wherein the second divider divides by a second prime number different than the first prime number.

6. The system of claim 4 wherein the test signal generator further includes a second clock having an output, a third divider having an output and a fourth divider having an output, the output of the second clock coupled to the third divider and the fourth divider, and wherein the test signal generator generates a demodulation signal by XORing the output of the third divider with the output of the fourth divider, and wherein the demodulation signal is provided to the test signal detector.

7. The system of claim 1 wherein the test signal detector includes a comparator and an accumulator, and wherein the test signal detector compares the demodulated output signal to a threshold value using the comparator, and wherein the test signal detector accumulates an output of the comparator using the accumulator, and wherein the monitor output is generated based at least in part of the accumulated output of the comparator.

8. The system of claim 1 wherein the test signal detector is further configured to determine a measure of an amplitude of the detected effects of the test signal.

9. A sensing device, comprising:

a microelectromechanical (MEMS) accelerometer transducer;

a control loop coupled to the MEMS accelerometer transducer, the control loop having a forward path generating an output of the sensing device and a feedback path feeding back the output of the sensing device to the MEMS accelerometer transducer;

a test signal generator, the test signal generator configured to generate a test signal and a demodulation signal, where the test signal and the demodulation signal have identical frequency content, and wherein the test signal generator is configured to apply the test signal to the forward path of the control loop during operation of the sensing device; and a test signal detector, the test signal detector configured to receive the output of the sensing device from the control loop and demodulate the output of the sensing device using the demodulation signal to detect effects of the test signal in the output of the sensing device, the test signal detector further configured to generate a monitor output indicative of the operation of the sensing device based at least in part on the detected effects of the test signal in the output of the sensing device.

10. The sensing device of claim 9 wherein the test signal generator includes a first clock having an output, a first divider having an output and a second divider having an output, the output of the first clock coupled to the first divider and the second divider, and wherein the test signal generator is configured to generate the test signal by XORing the output of the first divider with the output of the second divider, where the first divider is configured to divide by a first prime number and the second divider is configured to divide by a second prime number different than the first prime number.

11. The sensing device of claim 9 wherein the output of the sensing device is a quantized output, and wherein the test signal detector includes a comparator and an accumulator, and wherein the test signal detector compares the demodulated output of the sensing device to a first threshold value using the comparator, and wherein the test signal detector accumulates an output of the comparator using the accumulator, and wherein the monitor output is generated when the accumulated output passes a second threshold value.

12. A method of monitoring operation of a sensing device, where the sensing device includes microelectromechanical (MEMS) accelerometer transducer and a control loop having a forward path coupled to the MEMS accelerometer transducer, the method comprising:

generating a test signal;

applying the test signal to the forward path of the control loop during operation of the MEMS accelerometer transducer;

receiving an output signal from the control loop;

detecting effects of the test signal in the output signal, wherein the detecting effects of the test signal in the output signal comprises demodulating the output signal using a demodulation signal; and generating a monitor output indicative of the operation of the sensing device based at least in part on the detected effects of the test signal.

13. The method of claim 12 wherein the generating the test signal comprises generating a modulated signal.

14. The method of claim 12 wherein the generating the test signal comprises dividing a first clock with a first divider to generate a first divider output, dividing the first clock with a second divider to generate a second divider output, and XORing the first divider output with the second divider output to generate the test signal.

15. The method of claim 14 wherein the dividing the first clock with the first divider comprises dividing by a first prime number, and wherein dividing the first clock with the second divider comprises dividing by second prime number different than the first prime number.

16. The method of claim 14 further comprising generating the demodulation signal by dividing a second clock with a third divider to generate a third divider output, dividing the second clock with a fourth divider to generate a fourth divider output, and XORing the third divider output with the fourth divider output.

17. The method of claim 12 wherein the generating the monitor output indicative of the operation of the sensing device based at least in part on the detected effects of the test signal comprises comparing the demodulated output signal to a threshold value and accumulating an output of the comparison.

18. The method of claim 12 further comprising determining a measure of an amplitude of the detected effects of the test signal.

* * * * *